Figure 1:
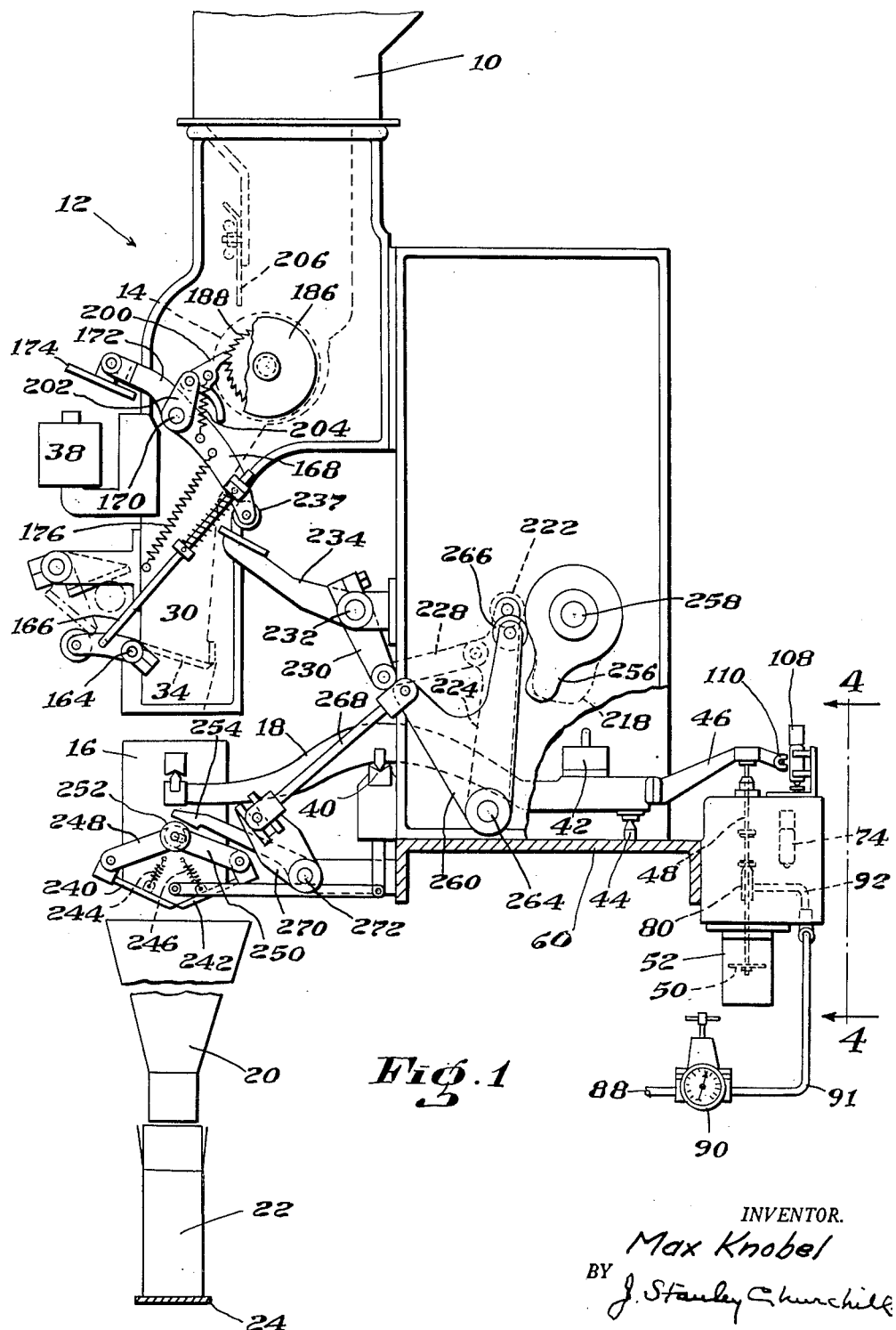

April 7, 1953 M. KNOBEL 2,634,080
WEIGHING MACHINE
Filed Oct. 29, 1948 3 Sheets-Sheet 1

INVENTOR.
Max Knobel
BY J. Stanley Churchill
ATTORNEY

April 7, 1953　　　　　M. KNOBEL　　　　　2,634,080
WEIGHING MACHINE
Filed Oct. 29, 1948　　　　　　　　　　3 Sheets-Sheet 2
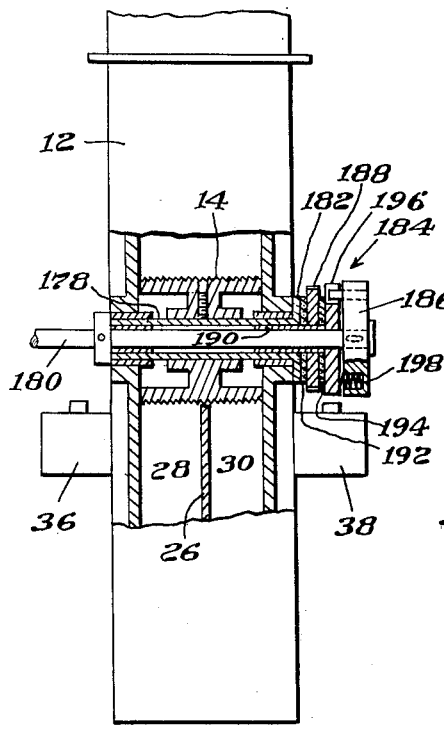
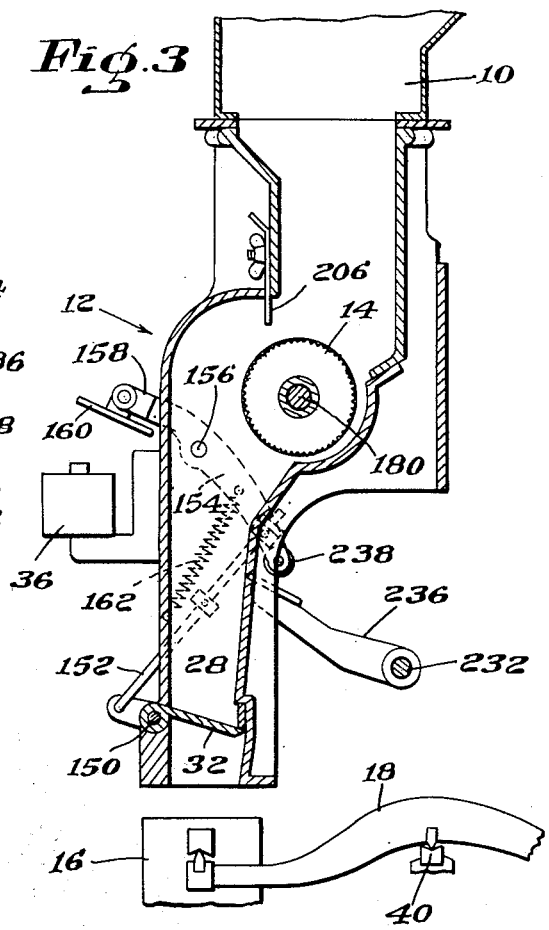
INVENTOR.
Max Knobel
BY
J. Stanley Churchill
ATTORNEY April 7, 1953   M. KNOBEL   2,634,080
WEIGHING MACHINE
Filed Oct. 29, 1948   3 Sheets-Sheet 3
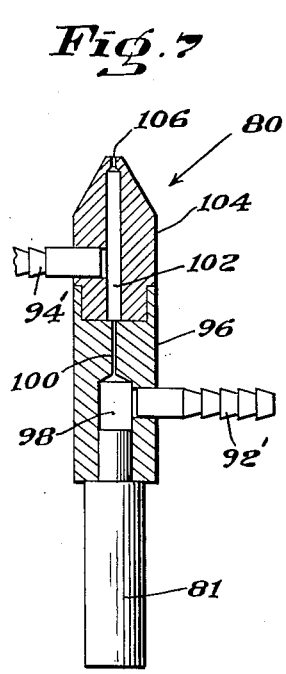
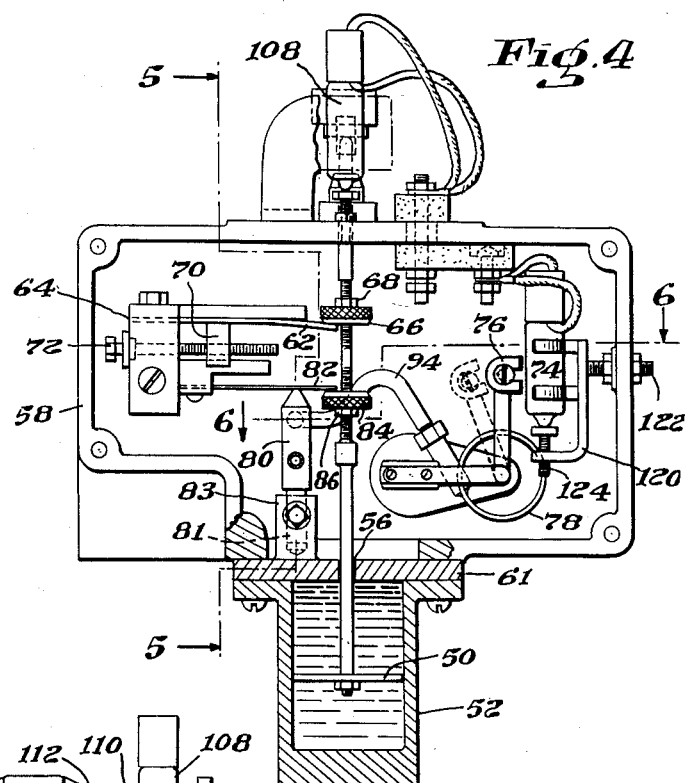
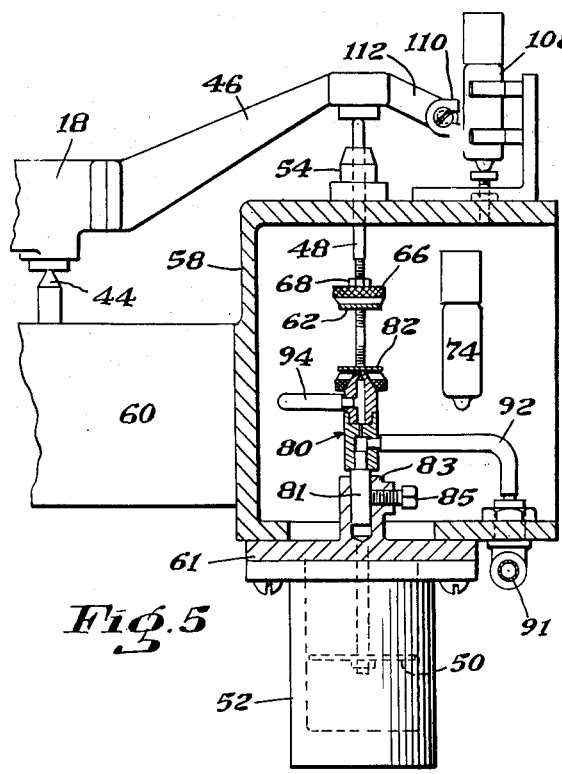
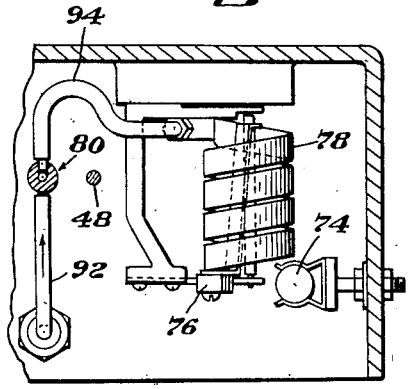
INVENTOR.
Max Knobel
BY J. Stanley Churchill
ATTORNEY Patented Apr. 7, 1953

2,634,080

UNITED STATES PATENT OFFICE 2,634,080

WEIGHING MACHINE

Max Knobel, Arlington, Mass., assignor to Pneumatic Scale Corporation, Limited, Quincy, Mass., a corporation of Massachusetts Application October 29, 1948, Serial No. 57,148

10 Claims. (Cl. 249—48)

This invention relates to a weighing machine.

The invention has for an object to provide a novel and improved weighing machine adapted to weigh solid flowable material in an extremely rapid, accurate and efficient manner.

With this general object in view and such others as may hereinafter appear, the invention consists in the weighing machine and in the various structures, arrangements and combinations of parts hereinafter described and particularly defined in the claims at the end of this specification.

In the drawings illustrating the preferred embodiment of the invention, Fig. 1 is a side elevation of a weighing machine embodying the present invention; Fig. 2 is a front elevation partly in cross-section of the material feeding mechanism shown in Fig. 1; Fig. 3 is a vertical cross-section of the material feeding hopper shown in Fig. 1; Fig. 4 is an elevation of the control mechanism as viewed from the line 4—4 of Fig. 1; Fig. 5 is a cross-sectional view taken on the line 5—5 of Fig. 4; Fig. 6 is a plan view detail, partly in cross-section, of a portion of the control mechanism, as viewed from the line 6—6 of Fig. 4; Fig. 7 is an enlarged detail view in cross-section of a part of the pneumatic control mechanism to be referred to, and Fig. 8 is a wiring diagram to be referred to.

In general, the present invention contemplates a weighing machine embodying a weighing element and material feeding means for feeding the flowable solid material upon the weighing element, together with novel pneumatically operated control mechanism for controlling the material feeding operation. The pneumatically operated control mechanism includes a conduit through which air under substantial pressure may be caused to flow to be discharged through a small discharge orifice. The conduit is provided with a restricted throat portion spaced in advance of the discharge orifice arranged to offer a substantial resistance to the flow of air therethrough, and the control mechanism is further provided with means movable with the weighing element and in effect constituting a valve for opening and closing the discharge orifice. With this arrangement, upon minute movement of the weighing element the valve operates to open the discharge orifice a minute amount, such for example as .001 of an inch, thereby effecting a substantial pressure drop in the portion of the conduit between the discharge orifice and the throat, and provision is made for utilizing such pressure drop for actuating control mechanism for controlling the material feeding operation.

In the preferred and illustrated embodiment of the invention the aforesaid pneumatically operated control mechanism is used in controlling the feeding of the bulk load onto the weighing element, and provision is made for controlling the rip stream by novel control mechanism actuated when the scale beam in its movement has been moved into a predetermined position. Provision is also preferably made for enabling adjustment to be made of the points in the movement of the scale beam at which both the bulk and drip streams may be cut off.

In the operation of prior commercial automatic weighing machines a stream of material is fed onto the weighing end of a counter-weighed scale beam and when a predetermined weight is reached, provision is made through control mechanism actuated by movement of the scale beam for cutting off the stream of material. One of the major time-consuming factors in the operation of such automatic weighing machines having control mechanism actuated by the movement of a counter-weighted scale beam, is the time required for the scale beam to move from a position at rest to an unbalanced position through a distance sufficient to actuate the control mechanism after the predetermined weight has been delivered to the weighing end of the scale beam. During this time interval the stream of material continues to flow onto the scale beam and in practice, the scale beam counterweight is manually adjusted by trial in an attempt to compensate for the amount of material added to the load during this time interval, the degree of accuracy of the final load being thus dependent upon the uniformity of the stream being fed. As is well known, non-freely flowable materials cause wide variations in the weights obtainable.

The present invention enables the control mechanism for cutting off the feeding of material onto the scale beam to be effected immediately upon movement of the scale beam through a very minute distance, such as a movement of one-thousandth of an inch or less, thus substantially reducing the time required for the weighing cycle and substantially reducing the amount of material added to the load on the scale after the scale beam has tripped, thus enabling far greater accuracy in the weighing operation to be obtained irrespective of variations in the rate of flow of the material being weighed.

The invention is herein illustrated as embodied in an automatic net weight weighing machine of the general type illustrated and described in the U. S. patent to S. R. Howard, No. 2,364,902, issued December 12, 1944, to which reference may be made.

Referring now to the drawings, the illustrated weighing mechanism is provided with a storage hopper 10 for the bulk supply of the material to be weighed and from which the material flows by gravity into an individual material feeding hopper indicated generally at 12. The material feeding hopper 12 is provided with a rotary drum 14 by which the material is fed through the hopper to be received by a receptacle 16 disposed upon the weighing end of a scale beam 18. In the operation of the machine when the receptacle 16 has received its final load it is arranged to be opened to release its material which is permitted to flow through a funnel or guide chute 20 into a carton 22 disposed therebeneath. The cartons are supported upon a conveyer belt 24, which is arranged to convey the cartons from a supply thereof into a position beneath the funnel 20 to receive the material, as illustrated in the Howard patent above referred to.

Referring now to Figs. 2 and 3, the material feeding hopper 12 is divided longitudinally by a partitioning member 26 to provide two passageways 28 and 30 through which the material passes to be delivered into the receptacle 16. Each passageway is provided with its individual gate 32, 34 both of which are arranged to be opened to permit material to be fed to the scale receptacle 16 at the beginning of each cycle of operation. During the weighing cycle each gate is arranged to be closed independently of the other, one gate being closed at the end of the primary or bulk load weighing period and the other being closed at the end of the final or drip load weighing period. The gates 32, 34 are held in their open position during the weighing cycle through connections to electro-magnets 36, 38 forming part of a circuit diagrammatically illustrated in Fig. 8. The circuit is arranged to be broken through control mechanism, to be hereinafter described, when the scale beam is moved by the weight of the material in the receptacle during the primary or bulk weighing period to de-energize the electro-magnet 36, whereupon the gate 32 is automatically closed. Thereupon, during the continued flow of the drip stream the scale beam is caused to continue its movement until the final weight is reached whereupon the circuit is broken to de-energize the electro-magnet 38 at the end of the final weighing operation to close the gate 34.

As illustrated in Fig. 3 the gate 32 which is arranged to close the passageway 28 is pivotally mounted at 150 in the hopper frame, and is connected by a link 152 to one arm 154 of a two-armed lever rockingly mounted on a stud 156 secured to the hopper. The second arm 158 of the two-armed lever is provided with an armature 160 of the electro-magnet 36. The electro-magnet 36 when energized operates to hold the gate 32 in its open position, and when de-energized, the gate is closed by a spring 162.

Referring now to Fig. 1, the gate 34 which is arranged to close the adjacent passageway 30, is similarly mounted on a pin 164 and is connected by a link 166 to one arm 168 of a two-armed lever pivotally mounted on a stud 170. The second arm 172 of the two-armed lever is provided with a similar armature 174 adapted to engage its electro-magnet 38 when the latter is energized to hold the gate 34 open. A similar spring 176 tends to close the gate 34 when the electromagnet is de-energized.

Provision is made for rotating the feed drum 14 continuously during the entire weighing cycle and for stopping the movement of the drum at the end of the drip feed weighing period. As herein shown, see Figs. 1 and 2, the feed drum 14 is fixed to an elongated sleeve 178 loosely mounted on a continuously rotated shaft 180, the latter being arranged to be rotated through drive mechanism illustrated and described in the Howard Patent No. 2,364,902, to which reference may be made. The elongated sleeve 178 is provided with a flanged end 182 and the drum is arranged to be driven through pressure exerted against the flange 182 by a yieldingly engaged friction clutch indicated generally at 184, the driving member 186 being keyed to the shaft 180. A ratchet 188 loosely mounted on a bushing 190 is engaged between friction members 192, 194 arranged to be compressed by the driven member 196, the latter being urged against the ratchet and friction members by springs 198, to effect rotation of the drum 14. As illustrated in Fig. 1, a pivotally mounted pawl 200, carried by an extension 202 of the two-armed lever 168, 172 is arranged to engage the ratchet 188 to stop the drum at the end of the final weighing operation. The pawl 200 is held in engagement with its ratchet by a spring 204. When the two-armed lever is reset, to be held by the electro-magnet 38 at the beginning of a new cycle of operation, as will be described, the pawl 200 is rocked beyond the path of the ratchet 188 and the drum 14 is permitted to rotate to feed the material through the hopper.

It will be observed that the drum 14 feeds material continuously into both passageways 28, 30 during the entire weighing cycle, and that when the gate 32 is closed, the material being fed into the passageway 28 during the final weighing operation, is permitted to accumulate therein so as to form a bulk load to be released into the scale receptacle 16 at the beginning of the succeeding weighing cycle.

From the description thus far it will be observed that the feed drum 14 is arranged to be continuously driven during the weighing cycle to feed material from the supply hopper 10 through the compartments 28, 30 of the feed hopper 12 and that the gates 32, 34 of the hopper are arranged to be independently operated to permit one gate to be closed during one period of the weighing cycle and to subsequently close the second gate when the final load has been introduced into the weighing bucket 16. As illustrated in Fig. 1, an adjustable gate 206 is provided above the feed drum 14 in order to control the amount of material being withdrawn from the supply hopper.

In the operation of the illustrated machine, provision is made for permitting two weighing operations to be performed on the scale beam 18 during each cycle of operation, first a bulk load and then a drip or final weight load. As shown in Fig. 1, the scale beam 18 is mounted on knife edges 40 in the usual manner, having the receptacle 16 at the weighing end and being provided with the usual counterweight 42 at its other end. In its normal or inoperative position the scale beam rests against a stop member 44 to maintain the scale level. The scale beam is further provided with an extension 46 at its counterweight end arranged to engage the upper end of a vertical rod 48 operatively connected to the piston 50 of a dash pot 52, as shown in Fig. 4.

The vertical rod 48 is slidingly mounted in bearing members 54, 56 formed in a protective housing 58 attached to the plate 60 of the machine frame, and in the dash pot cover 61 respectively, as shown. The vertical rod 48 is normally urged upwardly by a leaf spring 62 carried by an adjustable unit 64 mounted in the housing 58 and arranged to engage the underside of a knurled nut 66 adjustably mounted on a threaded portion of the rod 48. The nut 66 may be locked in its adjusted position by a lock nut 68. In its normal position, as illustrated in Figs. 1 and 4, the dash pot rod 48 is held in its depressed position by the scale beam to load the leaf spring 62, and during the primary or bulk load weighing operation the tension of the leaf spring 62 serves to reduce the effective counterweight of the scale beam 18, as will be described. The leaf spring 62, as shown in Fig. 4, is slidingly mounted in the unit 64 and is provided with a depending nut portion 70 arranged to cooperate with an adjusting screw 72 to permit longitudinal adjustment of the leaf spring and effect a variation in the force exerted by the spring against the adjustable nut 66. In practice if the final weight to be weighed is, for example, 16 ounces, the leaf spring 62 may be adjusted to exert an upward force of approximately 2 ounces, thus reducing the effective counterweight to 14 ounces during the bulk loading operation. Thereafter during the final or drip load weighing period of operation, the tension of the leaf spring 62 is gradually spent as the rod 48 is urged upwardly to follow the scale beam during continued movement of the latter thus effecting an increase in the effective counterweight at this time, as will be hereinafter described.

The control mechanism for effecting closing of the bulk load gate 32 as herein shown includes a magnetic type switch 74 of known construction arranged to cooperate with a magnet 76 forming part of pneumatically operated control mechanism of such structure as to be actuated by movement of the scale beam through a very minute distance. One available form of magnetic switch 74 comprises a pair of contacts sealed in a glass tube and having a pool of mercury at its lower end. One of the contacts is fixed in the mercury, the other being movable into and out of the mercury to close and open the circuit, and provision is made for affecting such movement by the influence of the magnet 76. The magnetic switch 74 herein illustrated is of the normally open type as indicated in Fig. 8, and is arranged to be held in its closed position by the magnet 76 when the latter is rocked into a vertical position, as illustrated in full lines in Fig. 4. The magnet 76 is operatively connected to one end of a Bourdon tube 78, the other end of the tube being connected to a conduit unit 80 connected at its entrance end to a source of air under substantial pressure. As shown in Fig. 7, the unit 80 is provided with a small discharge orifice 106 at its discharge end with which a valve member 82 cooperates, see Fig. 4, carried by the unit 64 to be movable with the scale beam, the valve normally being in contact with the discharge end of the unit 80 as shown, to close the orifice and maintain a predetermined pressure in the Bourdon tube and to thus maintain the magnet in its vertical position to maintain the magnetic switch 74 closed.

The magnetic switch 74 forms a part of the circuit to the bulk load solenoid 36 as illustrated in Fig. 8, and in operation when the pressure falls in the Bourdon tube 78, the magnet 76 is caused to be rocked to the left as illustrated in dotted lines in Fig. 4. In accordance with the present invention provision is made for effecting a substantial reduction in air pressure within the Bourdon tube 78 immediately when the valve 82 opens the discharge orifice 106 a minute amount, as for example .001 of an inch, and the valve 82 is arranged to move with the scale beam when the latter starts its movement through a similar minute amount, with the result that during the operation of the machine when the predetermined bulk load has been delivered upon the weighing end of the scale beam and the latter starts to move, the magnet 76 is instantly rocked to permit the magnetic switch 74 to open, thus immediately cutting off the bulk stream. As herein shown, the valve 82 is arranged to be lifted out of engagement with the discharge orifice 106 by a knurled nut 84 mounted on a threaded portion of the vertical rod 48. The nut 84 is adjustable on the rod 48 and is maintained in its adjusted position by a lock nut 86. Air under pressure may be supplied to the control unit 80 by any usual or preferred form of regulated air supply, and as herein shown, from a supply through a pipe 88 having a pressure gauge 90 connected by tubes 91, 92 to the unit 80. The unit 80 may be connected by a flexible tube 94 to the end of the Bourdon tube 78, and as shown in detail in Fig. 5, the unit 80 is provided with a plug extension 81 at its lower end mounted for vertical adjustment in a boss 83 formed in the dash pot cover 61 to permit vertical adjustment of the unit, the latter being locked in its adjusted position by a set screw 85. As clearly shown in Fig. 4, the magnetic switch 74 is mounted in a bracket 120 adjustably supported by a threaded extension 122 attached to one wall of the housing 58 for adjusting the switch tube laterally with respect to the magnet. The switch tube is also arranged to be adjusted vertically in the bracket 120 by an adjusting screw 124, as shown.

The preferred form of conduit unit 80 is illustrated in Fig. 7 and comprises a portion 96 provided with a chamber 98 therein having a hose fitting 92' inserted into a hole in the body portion 96 to communicate with the chamber 98. The upper portion 104 of the unit 80 which may be made of a harder metal, is provided with a chamber 102 therein connected by a constricted opening 100 to the chamber 98, as shown. The upper portion 104 of the unit is also provided with a fitting 94' over which the flexible hose 94 is placed to connect the chamber 102 with the end of the Bourdon tube 78, as shown in Fig. 6. With this construction, air under substantial pressure, as for example 50 pounds, is supplied to the chamber 98 and the flow thereof is resisted by passage through the constricted opening 100 so that a substantial but reduced air pressure exists in the chamber 102. This reduced air pressure is sufficient to hold the magnet 76 secured to the operating end of the Bourdon tube in a vertical position, such as is shown in Fig. 4. The discharge orifice 106 is of a size such that when the valve 82 is moved to open the orifice 106 a minute amount, as for example .001 of an inch, a substantial reduction occurs in the air pressure within the chamber 102 and consequently within the Bourdon tube connected therewith, resulting in the immediate rocking of the magnet 76 into the position shown in dotted lines in Fig. 4 and opening the magnetic switch 74, cutting off the flow of the bulk stream to the scale beam.

In practice, the knurled nut 84 mounted on the rod 48 may be adjusted to provide a slight clearance between the top of the nut and the underside of the valve 82 when the scale beam is in its inoperative or non-weighing position in order to assure closing engagement of the valve on the orifice at this time.

In operation, when the scale beam receptacle 16 has received a predetermined amount of material during the bulk load weighing period, the scale beam 18 will be moved to permit the vertical rod 48 to move upwardly under the influence of the spring 62 and to thus permit the nut 84 to lift the valve 82, thus reducing the pressure to the Bourdon tube, and as previously described, causing the magnet 76 to be rocked in a counterclockwise direction, as shown in dotted lines in Fig. 4, and thus opening the circuit at the switch 74 whereupon the electro-magnet 36 will be de-energized to permit the bulk load gate 32 to be closed under the influence of the spring 162. As above stated, a relatively large pressure change occurs upon movement of the scale beam 18 and the valve 82 through very minute distances, thus greatly reducing the time required to actuate the control mechanism and contributing to the speed and accuracy of the weighing operation. As a result of cutting off or terminating the bulk weight stream immediately after a predetermined bulk weight has been reached, the amount of material added to the load by the stream in the air between the feeding hopper and the receptacle after the predetermined weight is reached is substantially reduced due to the sensitivity and speed of operation of the pneumatic control unit in cutting off the stream thus contributing materially to the accuracy of the weighed load. During operation, the accumulation of dust and foreign matter in the orifice 106 and other passageways of the unit 80, is prevented by the air flow, thus insuring dependable operation.

After the bulk weight stream has been terminated in the manner above described, the drip stream continues to flow into the receptacle 16 and the counterweight end of the scale beam 18 continues to rock upwardly until the predetermined final weight of mateiral is deposited in the weighing receptacle, whereupon provision is made for terminating the drip stream. It will be observed that during the bulk weighing period of operation, the scale beam is yieldingly supported upon the end of the vertical rod 48 connected to the dash pot, thus effecting damping of the vibrations of the scale beam as it is lifted off the fixed stop 44 and further contributing to the accuracy of the weighing operation, and that during the final weighing operation the tension of the leaf spring 62 for urging the rod 48 upwardly is gradually reduced, thus increasing the effective counterweight.

The control mechanism for effecting closing of the final load gate 34, as herein shown, includes a magnetic type switch 108 arranged to cooperate with a magnet 110 secured to an extension 112 of the scale beam 18. The magnetic switch 108 is also of the normally open type and is arranged to be held in its closed position by the magnet 110 when the scale beam is in its normal or inoperative position as illustrated in Fig. 5. The magnetic switch 108 is adjustably mounted on the upper portion of the housing 58 and is arranged to be opened when the scale beam is rocked to a predetermined position to move the magnet 110 out of operative position with relation to the magnetic switch. As illustrated in Fig. 8, the magnetic switch 108 forms part of the circuit to the drip load solenoid 38 so that in the operation of the machine when the predetermined final weight is reached the circuit will be opened at the switch 108, whereupon the electro-magnet 38 will be de-energized to release the armature 174 and permit the arm 172 to be rocked by the spring 176 to close the drip gate 134. It will also be observed that rocking of the arm 172 moves the pawl 200 into engagement with the ratchet 188 to stop rotation of the feed drum 14.

In the actual operation of the machine there is no apparent delay in the rocking movement of the scale beam once it has started to move until both gates 32, 34 are closed through the control mechanisms described, so that in practice, a continuous rocking movement of the scale beam effects closing of the bulk load gate and the drip load gate in rapid succession in accordance with the weight of the material deposited into the receptacle by the continuously flowing stream, thus enabling the weighing operation to be performed rapidly without sacrificing accuracy.

At the end of the final weighing operation, provision is made for releasing the weighed loads in the receptacles to permit the material to fall by gravity through the funnels 20 and into the cartons 22 placed therebeneath. As herein shown, the bottom of the receptacle comprises two shutters 240, 242 pivotally mounted on the receptacle and normally held in their abutting and closed position by springs 244, 246. The shutters are connected by toggle links 248, 250 provided with a roller 252 at their connected ends adapted to be engaged by an arm 254 to operate the toggle linkage to effect opening of the shutters. As illustrated in Fig. 1, the arm 254 is arranged to be operated through connections from a cam 256, fast upon a one revolution cam shaft 258 journalled in suitable bearings in the machine frame. A bell crank 260 pivotally mounted on a cross-shaft 264 carries a roller 266 on one arm, the other arm being connected by a link 268 to a lever 270 clamped to a rocker shaft 272. The operating arm 254 is also fast upon the rocker shaft 272 so that through the connections described, the receptacle is opened to deliver the weighed load to the package disposed therebeneath.

Provision is also made at the end of the final weighing cycle, for resetting the parts into their original position in order to enable the scales to perform another cycle of operation. As illustrated in Fig. 1, the armatures 160, 174 of the electro-magnets 36, 38 respectively, are arranged to be returned into operative engagement with their electro-magnets through connections from a cam 218 mounted fast upon the cam shaft 258. The cam 218 is arranged to cooperate with a roller 222 carried by a cam lever 224 pivotally mounted at 264 and the lever 224 is connected by a link 228 to an arm 230 clamped on a rocker shaft 232. The rocker shaft is provided with rocker arms 234, 236 fast thereon which are arranged to engage rollers 237, 238 carried by arms 166, 154 respectively to rock the latter on their pivots 170, 156 and to effect the resetting operation. It will also be observed that resetting of the arm 168 effects removal of the pawl 200 to permit the drum 14 to be again rotated to feed the material, as described. The cam shaft 258 may be rotated in any usual or preferred manner preferably through connections from the weighing machine driving mechanism in the manner illustrated and described in the Howard Patent No. 2,364,902. In practice the cam shaft is controlled by a one revolution clutch, not shown, arranged to permit the cam shaft to make one revolution at the end of each weighing cycle to effect release of the weighed load and to reset the filling and weighing mechanism as above described. Provision may also be made upon termination of the final weighing operation for automatically returning and locking the scale beam 18 in its original position against the fixed stop 44 through cam operated linkage, not shown, in readiness for a succeeding weighing cycle, the scale beam being unlocked immediately after the initial accumulated bulk of material is released from the hopper 12.

While the invention has been herein illustrated and described as embodied in a weighing machine capable of performing a bulk weighing operation and a drip weighing operation on the same scale beam, and provided with separate controls for each, it will be observed that the illustrated weighing machine may be operated to provide a single stream of material adapted to be terminated by a single control mechanism preferably the control mechanism embodying the pneumatic control mechanism above described. As illustrated in Fig. 8 the second control mechanism embodying the magnetic switch 108 may be cut out of the circuit by opening the switch 114, and by closing the switch 116, the drip load solenoid 38 will be connected in parallel with the bulk load solenoid 36 so that each gate 32, 34 will be simultaneously closed upon opening of the circuit at the magnetic switch 74 when the predetermined weight is reached. Thus in the operation of the machine when a predetermined weight has been deposited into the receptacle 16 the scale beam 18 will be moved and through the connections previously described, the circuit will be opened at the switch 74 to de-energize the electro-magnets 36, 38 to permit simultaneous closing of the gates 32 and 34.

While the invention has been illustrated and described as comprising a single weighing unit, it will be understood that in practice the illustrated unit may comprise one of a plurality of similar units forming a multi-unit weighing machine such as is illustrated and described in the Howard Patent No. 2,364,902. Such a multi-unit machine may also be provided with the usual controls for preventing initiation of a new weighing cycle until each unit has completed its individual weighing operation and for simultaneously resetting the weighing units and releasing their weighed loads into the containers 22 in timed relation to the movement of the containers on the conveyer 24.

In its broader aspects the invention contemplates a weighing machine embodying a weighing element, together with material feeding mechanism and the present pneumatically operated control mechanism responsive to minute movements of the weighing element when the predetermined weight is reached.

While the preferred embodiment of the invention has been herein illustrated and described, it will be understood that the invention may be embodied in other forms within the scope of the following claims.

Having thus described the invention, what is claimed is:

1. In a weighing machine for weighing flowable solid material, in combination, a scale beam having a counterweighted end, material feeding means for feeding a drip stream and a bulk stream onto the scale beam, and control means for controlling delivery of said streams including a movable member cooperating with the scale beam, a spring cooperating with said movable member urging the counterweighted end of the scale beam upwardly and constituting a means for reducing the effective counterweight, a conduit through which air under pressure may flow, said conduit having a reduced discharge orifice, a restricted throat portion spaced in advance of the discharge orifice for offering resistance to the flow of air therethrough, a valve member normally closing said discharge orifice and adapted to be moved in the direction of the discharge of air from said discharge orifice by the aforesaid spring actuated movable member upon movement of the scale beam when a predetermined weight is reached to open said discharge orifice whereby when the discharge orifice is opened a substantial pressure variation occurs in the conduit between it and said throat, and mechanism actuated in response to such pressure variation for cutting off the bulk stream.

2. In a weighing machine for weighing flowable solid material, in combination, a scale beam having a counterweighted end, material feeding means for feeding a drip stream and a bulk stream onto the scale beam, and control means for controlling delivery of said streams including a movable member cooperating with the scale beam, a spring cooperating with said movable member to urge the counterweighted end of the scale beam upwardly and constituting a means for reducing the effective counterweight, a conduit through which air under pressure may flow, said conduit having a reduced discharge orifice, a restricted throat portion spaced in advance of the discharge orifice for offering resistance to the flow of air therethrough, a valve member normally closing said discharge orifice and adapted to be moved in the direction of the discharge of air from the orifice by the aforesaid spring actuated movable member upon movement of the scale beam when a predetermined weight is reached to open said discharge orifice whereby when the discharge orifice is opened a substantial pressure variation occurs in the conduit between it and said throat, mechanism actuated in response to such pressure variation for cutting off the bulk stream, and a switch controlling the drip stream actuated by continued movement of said scale beam.

3. In a weighing machine for weighing flowable solid material, in combination, a weighing element, material feeding means, and means actuated by movement of the weighing element for terminating the feeding of the material being weighed, said means comprising a conduit through which air under pressure may flow, said conduit having a discharge orifice smaller than the size of the conduit and a restricted throat portion spaced in advance of the discharge orifice offering resistance to the flow of air therethrough, means movable with the weighing element and cooperating with the discharge orifice for controlling the flow of air therethrough to thereby control the air pressure within the portion of the conduit between the discharge orifice and the throat, said last mentioned means moving in the direction of the discharge of air from said discharge orifice, and means actuated in response to given changes in such air pressure for terminating the operation of the material feeding means.

4. In a weighing machine, in combination, a scale beam having a counterweighted end, material feeding means for feeding a drip stream and a bulk stream onto the weighing element, and control means for controlling delivery of said streams including a movable member cooperating with the scale beam, a spring cooperating with said movable member to urge the counterweighted end of the scale beam upwardly and constituting a means for reducing the effective counterweight, a conduit through which air under pressure may flow, said conduit having a reduced discharge orifice, a restricted throat portion spaced in advance of the discharge orifice for offering resistance to the flow of air therethrough, a second spring connected to said spring actuated movable member for normally closing the discharge orifice and adapted to be moved by the aforesaid spring actuated movable member upon movement of the scale beam when a predetermined weight is reached to open said discharge orifice whereby when the discharge orifice is opened an amount of the order of .001 of an inch, a substantial pressure variation occurs in the conduit between it and said throat, and mechanism actuated in response to such pressure variation for cutting off the bulk stream.

5. In a weighing machine for weighing flowable solid material, in combination, a scale beam having a counterweighted end, material feeding means for feeding a drip stream and a bulk stream onto the weighing element, and control means for controlling delivery of said streams including a movable member cooperating with the scale beam, a spring cooperating with said movable member to urge the counterweighted end of the scale beam upwardly and constituting a means for reducing the effective counterweight, a conduit through which air under pressure may flow, said conduit having a reduced discharge orifice, a restricted throat portion spaced in advance of the discharge orifice for offering resistance to the flow of air therethrough, a valve member normally closing said discharge orifice and adapted to be moved in the direction of the discharge of air from the discharge orifice by the aforesaid spring actuated movable member upon movement of the scale beam when a predetermined weight is reached to open said discharge orifice whereby when the discharge orifice is opened a substantial pressure variation occurs in the conduit between it and said throat, means for adjusting said first spring, means for adjustably determining the point at which said valve member opens the discharge orifice upon movement of said movable member, and mechanism actuated in response to such pressure variation for cutting off the bulk stream.

6. In a weighing machine for weighing flowable solid material, in combination, a weighing element, material feeding means, and means responsive to movement of the weighing element for terminating the feeding of the material being weighed, said means comprising a conduit through which air under pressure may flow, said conduit having a reduced discharge orifice, a restricted throat portion spaced in advance of the discharge orifice for offering resistance to the flow of air therethrough, said weighing element having a surface movable therewith and initially disposed in a predetermined position relative to said discharge orifice and being movable from said position to another position in response to a predetermined weight of material acting on said weighing element, the movement of said weighing element to said other position causing a substantial variation in pressure to occur in said conduit between said discharge orifice and said throat, means operable in response to said pressure variation for terminating the feed of material to said weighing element, means for relieving said weighing element of said predetermined weight, and means automatically operating in timed relation to the operation of said load relieving means for returning said weighing element to said initial position after said weighing element has been relieved of said predetermined weight.

7. In a weighing machine for weighing flowable solid material, in combination, a weighing element, material feeding means, and means responsive to movement of the weighing element for terminating the feeding of the material being weighed, said means comprising a conduit through which air under pressure may flow, said conduit having a reduced discharge orifice, a restricted throat portion spaced in advance of the discharge orifice for offering resistance to the flow of air therethrough, said weighing element having a surface movable therewith in the direction of the discharge of air from the discharge orifice and being initially disposed in a predetermined position relative to said discharge orifice and movable from said position to another position in response to a predetermined weight of material acting on said weighing element, the movement of said movable surface to said other position causing a substantial variation in pressure to occur in said conduit between said discharge orifice and said throat, means operable in response to said pressure variation for terminating the feed of material to said weighing element, means for relieving said weighing element of said predetermined weight, and means automatically operating in timed relation to the operation of said load relieving means for returning said weighing element to said initial position after said weighing element has been relieved of said predetermined weight.

8. In a weighing machine for weighing flowable solid material, in combination, a weighing element, material feeding means, and means responsive to movement of the weighing element for terminating the feeding of the material being weighed, said means comprising a conduit through which air under pressure may flow, said conduit having a reduced discharge orifice, a restricted throat portion spaced in advance of the discharge orifice for offering resistance to the flow of air therethrough, said weighing element having a surface movable therewith in the direction of the discharge of air from the discharge orifice and being initially disposed in a predetermined position relative to said discharge orifice and movable from said position to another position in response to a predetermined weight of material acting on said weighing element, the movement of said movable surface to said other portion causing a substantial variation in pressure to occur in said conduit between said discharge orifice and said throat, and means operable in response to said pressure variation for terminating the feed of material to said weighing element.

9. In a weighing machine for weighing flowable solid material, in combination, a weighing element, material feeding means, and control means for terminating feeding of the material to the weighing element, said control means including a movable member cooperating with the weighing element to move the same upon movement of said member, a spring cooperating with said movable member and constituting means for exerting a force upon the weighing element in the direction of the force exerted by the weight of the material thereon, a conduit through which air under pressure may flow provided with a reduced discharge orifice, and a restricted throat portion spaced in advance of the discharge orifice for offering resistance to the flow of air therethrough, a second spring connected to said spring-actuated movable member, said second spring normally closing the discharge orifice and adapted upon movement of the movable member when a predetermined weight is reached to open said discharge orifice and thereby create a substantial pressure variation in the aforesaid conduit between the said orifice and said throat, and mechanism actuated in response to said pressure variation for terminating the feeding of the material onto the weighing element.

10. A weighing machine, as defined in claim 9, wherein means are provided for adjustably varying the strength of the first-mentioned spring.

MAX KNOBEL.

REFERENCES CITED

The following references are of record in the file of this patent:

UNITED STATES PATENTS

| Number | Name | Date |
| --- | --- | --- |
| Re. 12,335 | Bond | Apr. 4, 1905 |
| 711,934 | Bond | Oct. 28, 1902 |
| 1,893,622 | Howard | Jan. 10, 1933 |
| 2,033,586 | Noble | Mar. 10, 1936 |
| 2,077,525 | Mennesson | Apr. 20, 1937 |
| 2,170,249 | Wisner | Aug. 22, 1939 |
| 2,207,885 | Howard | July 16, 1940 |
| 2,212,085 | Tate | Aug. 20, 1940 |
| 2,212,419 | Harmon | Aug. 20, 1940 |
| 2,264,562 | Bryant et al. | Dec. 2, 1941 |
| 2,295,399 | Hanna | Sept. 8, 1942 |
| 2,364,902 | Howard | Dec. 12, 1944 |
| 2,408,685 | Rosenberger | Oct. 1, 1946 |
| 2,451,425 | Allwein | Oct. 12, 1948 |